3,505,340
1-SUBSTITUTED-3-SUBSTITUTED IMINO-
1,5,6,7,8,8a-HEXAHYDRO-3-H-THIAZOLO
[3,4-a] PYRIDINES AND INTERMEDI-
ATES THEREFOR
Albert J. Frey, Essex Fells, and Robert E. Manning Mountain Lakes, N.J., assignors to Sandoz-Wander, Inc., Hanover, N.J., a corporation of Delaware
No Drawing. Filed Oct. 5, 1967, Ser. No. 672,973
Int. Cl. C07d 29/36; A61k 27/00
U.S. Cl. 260—293.4       9 Claims

ABSTRACT OF THE DISCLOSURE

This disclosure pertains to 3-substituted imino thiazolo pyridines, e.g., 1 - p-chlorophenyl - 3 - phenylimino-1,5,6,7,8,8a-hexahydro - 3H - thiazolo [3,4 - a] pyridine. These compounds are useful as hypotensive agents.

---

This invention relates to novel heterocyclic compounds. In particular, this invention pertains to 3-substituted imino thiazolo pyridines and to methods for preparing them. The invention also relates to intermediates useful in preparing the above compounds and processes for their preparation.

The thiazolo pyridines of the present invention may be represented by the following structural formula

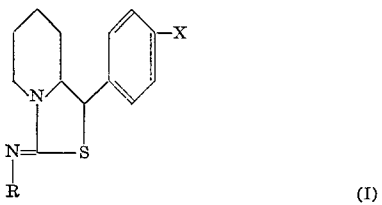

wherein

X is H or Cl; and R is lower alkyl or phenyl.

The above compounds (I) may be prepared by treating a piperidine thiocarboxamide with thionyl chloride and then heat. The thiocarboxamide is prepared from a phenyl or substituted phenyl piperidyl carbinol by reacting the latter with a substituted isothiocyanate. The process for preparing the thiazolo pyridines (I) may be represented by the following:

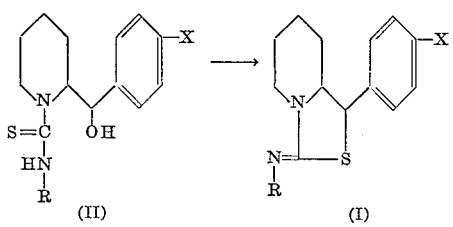

where R and X are as previously described.

According to the above process, the compound illustrated by Formula II may be treated with thionyl chloride in a solvent such as methylene chloride, chloroform, tetrahydrofuran, and the like, at a temperature of about 0–60° C., preferably about 30–50° C. The reaction mixture is then heated with water at about 20–100° C., preferably 40–70° C. Neither the solvent nor the temperature utilized is critical in the obtaining of the compounds of Formula I. The resulting products (I) are recovered according to conventional recovery techniques such as evaporation, crystallization and the like.

The thiocarboxamide (II) is prepared according to the following diagram:

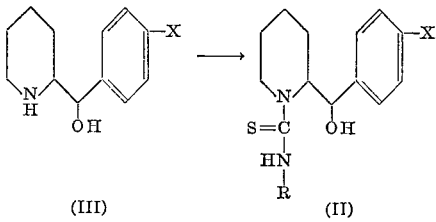

where X and R are as defined above.

In accordance with the above process for preparing compounds (II), a piperidyl carbinol (III) is treated with a lower alkyl or phenyl isothiocyanate, e.g. methyl isothiocyanate. This reaction may be conducted in solvents such as tetrahydrofuran, aromatic hydrocarbons such as benzene, and lower alkanols such as methanol, ethanol, and the like. Neither the solvent nor the reaction temperature is critical in obtaining the products (II). Desirably, however, the temperature of reaction may be about 0–80° C. and is preferably about 20–40° C. The carbinols (III) are known and can be prepared as described in the literature.

All of the compounds of structural Formulas I and II exist as optically active isomers. Separation and recovery of the respective stereoisomers may be readily accomplished employing conventional techniques, and all such isomers are included within the scope of this invention.

The pyridines represented by Formula I above are useful because they possess pharmaceutical properties in animals. In particular, these compounds are useful as hypotensives, as indicated by their activity in anesthetized dog tested by blood pressure measurement using a mercury manometer or transducer via a catheter inserted in the carotid or femoral artery. When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, these compounds (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

In general, satisfactory results are obtained when these compounds are administered at a daily dosage of about 0.5 milligrams to about 20 milligrams per kilogram of animal body weight. This daily dosage is preferably administered 2 to 4 times a day, or in sustained release form. For most large mammals such as primates, the total daily dosage is from about 40 milligrams to about 50 milligrams. Dosage forms suitable for internal use comprise from about 10 milligrams to about 25 milligrams of the active compound in intimate admixture with a solid or liquid pharmaceutically acceptable carrier or diluent.

A representative formulation suitable for oral administration is a tablet prepared by standard tabletting techniques which contains the following.

| Ingredients: | Parts by weight |
|---|---|
| 1-p-chlorophenyl-3-methylimino-1,5,6,7,8,8a-hexahydro-3H-thiazo[3,4-a] pyridine | 30 |
| Tragacanth | 2 |
| Lactose | 59.5 |
| Corn starch | 5 |
| Talcum | 3 |
| Magnesium stearate | 0.5 |

The following examples are provided for the purpose of illustration and not by way of limitation.

EXAMPLE 1

Step 1

2-(α-hydroxybenzyl)-N-methyl-1-piperidinethiocarboxamide

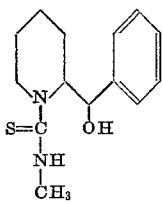

A mixture of phenyl-2-piperidyl carbinol (12 g.), methyl isothiocyanate and tetrahydrofuran (120 ml.) is stirred at room temperature for 1 hour, concentrated to a syrup in vacuo, and triturated with pentane (75 ml.). The resultant crystals are collected by filtration to give 15.8 g. of 2-(α-hydroxybenzyl)-N-methyl-1-piperidinethiocarboxamide; M.P. 145–147°.

Step 2

3-methylimino-1-phenyl-1,5,6,7,8,8a-hexahydro-3H-thiazolo[3,4-a]pyridine

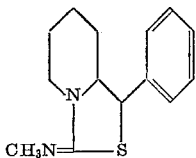

A solution of thionyl chloride (6.6 g.) in 120 ml. of methylene chloride is added dropwise over 15 minutes to a stirred suspension of 2(α-hydroxybenzyl)-N-methyl-1-piperidinethiocarboxamide (14.4 g.) in 400 ml. methylene chloride. The resultant mixture is refluxed for 20 minutes and evaporated in vacuo. The residue is heated with 200 ml. water at 70° for 15 minutes, cooled, and filtered. The filtrate is made alkaline with 150 ml. of 2 N sodium carbonate and extracted with 600 ml. of ether. The ether phase is dried over sodium sulfate and evaporated in vacuo to give 13 g. residue which is crystallized from methanol (60 ml.) to give 6.1 g. 3-methylimino-1-phenyl-1,5,6,7,8,8a-hexahydro - 3H - thiazolo[3,4-a]pyridine; M.P. 125–127°.

EXAMPLE 2

Step 1

2(4-chloro-α-hydroxybenzyl)-N-methyl-1-piperidinethiocarboxamide

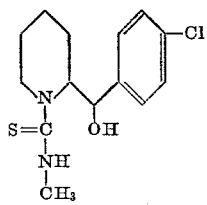

A mixture of p-chlorophenyl-2-piperidyl carbinol (12 g.), methylisothiocyanate (6 g.) and tetrahydrofuran (120 ml.) is stirred for 2 hours, concentrated to a syrup in vacuo and crystallized from ether (40 ml.) to give 14 g. of 2-(4-chloro-α-hydroxybenzyl)-N-methyl-1-piperidinethiocarboxamide; M.P. 175–177°.

Step 2

1-p-chlorophenyl-3-methylimino-1,5,6,7,8,8a-hexahydro-3H-thiazolo[3,4-a]pyridine

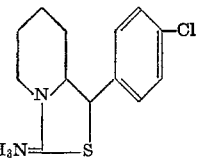

A solution of thionyl chloride (6.4 g.) in 120 ml. methylene chloride is added to a cooled (ice bath) suspension of 2(4 - chloro-α-hydroxybenzyl)-N-methyl-1-piperidinethiocarboxamide (16 g.) in 400 ml. methylene chloride. The mixture is refluxed for 20 minutes and evaporated in vacuo. The residue is heated at 70° for 15 minutes with 200 ml. water, cooled and filtered. The filtrate is made basic with sodium carbonate solution and extracted with ether. The ether is dried with sodium sulfate and evaporated. The residue is crystallized from pentane to give 1-p-chlorophenyl-3-methylimino-1,5,6,7,-8,8a-hexahydro-3H-thiazolo[3,4-a]pyridine, 7.0 g.; M.P. 107–109°.

EXAMPLE 3

Step 1

2-(4-chloro-α-hydroxybenzyl)N-phenyl-1-piperidinethiocarboxamide

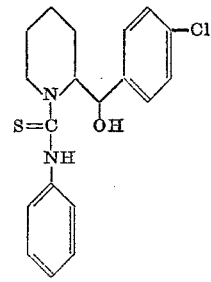

To a solution of erythro-p-chlorophenyl-2-piperidylcarbinol (11 g.) in 100 ml. of tetrahydrofuran is added with stirring a solution of phenylisocyanate (7 g.) in 30 ml. tetrahydrofuran. After stirring for 2 hours, the solution is concentrated in vacuo to a volume of 75 ml. and diluted with pentane (75 ml.). The resultant crystals are collected by filtration to provide 2-(4-chloro-α-hydroxybenzyl)N-phenyl-1-piperidinethiocarboxamide (16.1 g.); M.P. 139–141° C.

Step 2

1-p-chlorophenyl - 3 - phenylimino-1,5,6,7,8,8a-hexahydro-3H-thiazolo[3,4-a]pyridine.

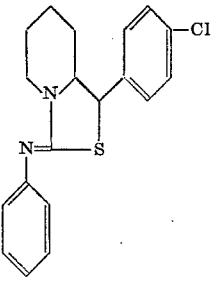

A solution of thionyl chloride (4–8 g.) in 120 ml. methylene chloride is added to a stirred suspension of 2(4-chloro-α-hydroxybenzyl)-N-phenyl - 1 - piperidinethiocarboxamide (15.0 g.) in methylene chloride (400 ml.) cooled in an ice bath. The reaction mixture is refluxed for ½ hour, evaporated to dryness in vacuo and the residue heated with 200 ml. of water for 15 minutes. After cooling, the resultant crystals are collected to give 15 g. of solid. This solid (14 g.) is dissolved by heating in 400 ml. of methanol, filtered, concentrated to a volume of 350 ml., diluted with 80 ml. of water, and cooled to give 2.8 g. of 1-p-chlorophenyl - 3 - phenylimino - 1,5,6,7,8,8a-hexahydro-3H-thiazolo[3,4-a]pyridine; M.P. 123–125° C.

What is claimed is:

1. A compound of the formula

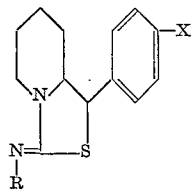

or a non-toxic pharmaceutically acceptable acid addition salt thereof,
where
X is H or Cl; and
R is lower alkyl or phenyl.

2. A compound according to claim 1 which is 3-methylimino - 1 - phenyl - 1,5,6,7,8,8a-hexahydro-3H-thiazolo[3,4-a]pyridine.

3. A compound according to claim 1 which is 1-p-chlorophenyl - 3 - methylimino-1,5,6,7,8,8a - hexahydro-3H-thiazolo[3,4-a]pyridine.

4. A compound according to claim 1 which is 1-p-chlorophenyl - 3 - phenylimino - 1,5,6,7,8,8a-hexahydro-3H-thiazolo[3,4-a]pyridine.

5. A compound of the formula

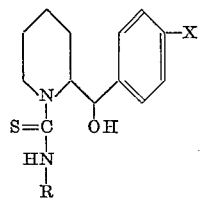

where
X is hydrogen or Cl; and
R is lower alkyl or phenyl.

6. A compound according to claim 5 which is 2-(α-hydroxybenzyl)-N-methyl - 1 - piperidinethiocarboxamide.

7. A compound according to claim 5 which is 2-(4-chloro - α - hydroxybenzyl)-N-methyl-1-piperidinethiocarboxamide.

8. A compound according to claim 5 which is 2-(4-chloro - α - hydroxybenzyl)-N-phenyl-1-piperidinethiocarboxamide.

9. A process for preparing the free base form of a thiazolo pyridine according to claim 1, which comprises treating a compound of the formula

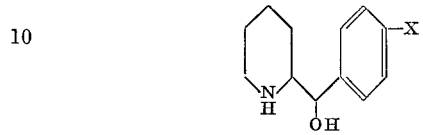

with a lower alkyl or phenyl isothiocyanate to obtain a compound of the formula

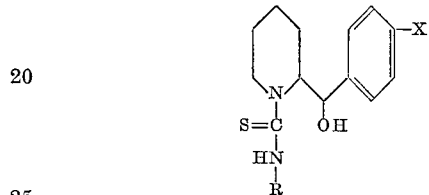

and treating this compound with thionyl chloride, water and heat to obtain the desired thiazolo pyridine.

References Cited

UNITED STATES PATENTS

| 1,915,334 | 6/1933 | Salzberg et al. | 260—243 |
| 2,075,359 | 3/1937 | Salzberg et al. | 167—22 |
| 2,958,680 | 11/1960 | Brooks et al. | 260—552 |

FOREIGN PATENTS

| 995,964 | 6/1965 | Great Britain. |

OTHER REFERENCES

Burger, Medicinal Chemistry, vol. 1, 1951, RS, pp. 44, 45 and 48.

S. D. WINTERS, Assistant Examiner

U.S. Cl. X.R.

260—294.7; 424—267